(12) United States Patent
Hong

(10) Patent No.: US 12,221,681 B2
(45) Date of Patent: Feb. 11, 2025

(54) STEEL PLATE FOR HIGH TEMPERATURE APPLICATIONS HAVING EXCELLENT STRENGTH AT HIGH TEMPERATURE AND METHOD FOR MANUFACTURING THE SAME

(71) Applicant: POSCO, Pohang-si (KR)

(72) Inventor: Soon-Taik Hong, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 766 days.

(21) Appl. No.: 17/297,111

(22) PCT Filed: Nov. 29, 2019

(86) PCT No.: PCT/KR2019/016700
§ 371 (c)(1),
(2) Date: May 26, 2021

(87) PCT Pub. No.: WO2020/111859
PCT Pub. Date: Jun. 4, 2020

(65) Prior Publication Data
US 2022/0025495 A1    Jan. 27, 2022

(30) Foreign Application Priority Data

Nov. 29, 2018    (KR) ........................ 10-2018-0150818

(51) Int. Cl.
| | |
|---|---|
| *C22C 38/44* | (2006.01) |
| *C21D 8/02* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |

(52) U.S. Cl.
CPC ............ *C22C 38/44* (2013.01); *C21D 8/0205* (2013.01); *C21D 8/0226* (2013.01); *C21D 9/46* (2013.01); *C22C 38/002* (2013.01); *C22C 38/02* (2013.01); *C22C 38/04* (2013.01); *C22C 38/06* (2013.01); *C22C 38/42* (2013.01)

(58) Field of Classification Search
CPC ....... C22C 38/44; C22C 38/002; C22C 38/02; C22C 38/04; C22C 38/06; C22C 38/42; C22C 38/00; C21D 8/0205; C21D 8/0226; C21D 9/46; C21D 1/26; C21D 1/28; C21D 6/002; C21D 8/0247; C21D 8/0263; C21D 9/50; C21D 1/18; C21D 2211/008; C21D 2211/002; Y02P 10/20
See application file for complete search history.

(56) References Cited

U.S. PATENT DOCUMENTS

| | | |
|---|---|---|
| 5,906,791 A | 5/1999 | Angeliu |
| 6,358,336 B1 | 3/2002 | Miyata |
| 6,406,564 B1 | 6/2002 | Muraki et al. |
| 8,821,653 B2 | 9/2014 | Anelli et al. |
| 2008/0283158 A1 | 11/2008 | Nagao et al. |
| 2018/0371567 A1 | 12/2018 | Hong |
| 2018/0371568 A1 | 12/2018 | Hong |
| 2019/0100818 A1 | 4/2019 | Kim et al. |
| 2020/0071798 A1 | 3/2020 | Hong |

FOREIGN PATENT DOCUMENTS

| | | | |
|---|---|---|---|
| CN | 1243169 A | 2/2000 | |
| CN | 101713051 A | 5/2010 | |
| CN | 105671436 A | 6/2016 | |
| CN | 107109589 A | 8/2017 | |
| EP | 2918694 A1 | 9/2015 | |
| JP | H09-256037 A | 9/1997 | |
| JP | 2001-073066 A | 3/2001 | |
| JP | 2001-164332 A | 6/2001 | |
| JP | 2001-234276 A | 8/2001 | |
| JP | 2006-045672 A | 2/2006 | |
| JP | 2006-77330 A | 3/2006 | |
| JP | 2007217783 A * | 8/2007 | |
| JP | 2011-001620 A | 1/2011 | |
| JP | 2014-95130 A | 5/2014 | |
| JP | 2016-079425 A | 5/2016 | |
| KR | 10-0833069 B1 | 5/2008 | |
| KR | 10-2012-0067149 A | 6/2012 | |
| KR | 2012067149 A * | 6/2012 | ........... C21D 8/0226 |
| KR | 10-2017-0073015 A | 6/2017 | |

(Continued)

OTHER PUBLICATIONS

Extended European Search Report dated Feb. 8, 2022 issued in European Patent Application No. 19888656.6.
Chinese Office Action dated May 7, 2022 issued in Chinese Patent Application No. 201980078568.6 (with English translation).
International Search Report issued in corresponding International Patent Application No. PCT/KR2019/016700 dated Mar. 5, 2020.
Chinese Office Action dated Jun. 15, 2023 issued in Chinese Patent Application No. 201980078568.6 (with English translation).
Chen Zhigang, et al., "Welding Process and Welding Defect Treatment Cases of Pressure Vessels," Metallurgical Industry Press, Apr. 30, 2018, pp. 41.

(Continued)

*Primary Examiner* — Anthony M Liang
*Assistant Examiner* — Danny N Kang
(74) *Attorney, Agent, or Firm* — Morgan, Lewis & Bockius LLP

(57) ABSTRACT

Provided are a steel plate for high temperature applications having excellent strength at a high temperature and a method for manufacturing same. The steel plate for high temperature applications having excellent post-weld heat treatment resistance, according to the present invention, comprises by weight percent: C:0.05-0.25%; Mn:0.1-1.0%; Si:0.1-0.8%; Cr:1-3%; Cu:0.05-0.3%; Mo:0.5-1.5%; Ni:0.05-0.5%; Al:0.005-0.1%; and at least one of Ir:0.005-0.10% and Rh:0.005-0.10%, the balance being Fe and inevitable impurities.

6 Claims, No Drawings

(56) References Cited

FOREIGN PATENT DOCUMENTS

| | | |
|---|---|---|
| KR | 10-2017-0075050 A | 7/2017 |
| KR | 10-2018-0071683 A | 6/2018 |
| WO | 2018/117496 A1 | 6/2018 |

OTHER PUBLICATIONS

Japanese Office Action dated Sep. 6, 2022 issued in Japanese Patent Application No. 2021-530166.

\* cited by examiner

STEEL PLATE FOR HIGH TEMPERATURE APPLICATIONS HAVING EXCELLENT STRENGTH AT HIGH TEMPERATURE AND METHOD FOR MANUFACTURING THE SAME

CROSS-REFERENCE OF RELATED APPLICATIONS

This application is the U.S. National Phase under 35 U.S.C. § 371 of International Patent Application No. PCT/KR2019/016700, filed on Nov. 29, 2019, which in turn claims the benefit of Korean Application No. 10-2018-0150818, filed on Nov. 29, 2018, the entire disclosures of which applications are incorporated by reference herein.

TECHNICAL FIELD

The present disclosure relates to manufacturing of a steel for medium-high temperature applications of about 400 to 600° C., such as a boiler and a pressure vessel of a power plant, and more particularly, to a steel plate having excellent high-temperature strength at 500° C., and a method for manufacturing the same.

BACKGROUND ART

Recently, in accordance with a tendency to actively develop an oil field in a poor environment due to phenomenon of a shortage of petroleum and the era of high oil prices, thickening of a steel plate for refining and storage of crude oil has been conducted.

In addition to the thickening of the steel plate as described above, post weld heat treatment (PWHT) is performed in order to remove stress generated at the time of welding the steel plate for the purpose of preventing deformation of a structure after welding the steel plate and stabilizing a shape and a dimension of the steel plate in a case of welding the steel plate. However, a steel plate subjected to a PWHT process for an extended period of time has a problem that high-temperature strength of the steel plate decreases due to coarsening of a structure of the steel plate.

That is, after the PWHT is performed for an extended period of time, a phenomenon in which strength and toughness simultaneously decrease due to softening of a matrix and a grain boundary, grain growth, coarsening of carbide, and the like, is caused.

As a means to prevent deterioration of physical properties due to such PWHT for an extended period of time, a technology of enabling a PWHT guarantee time of up to 16 hours by a process of performing heating and hot rolling on a slab containing, by wt %, 0.05 to 0.20% of C, 0.02 to 0.5% of Si, 0.2 to 2.0% of Mn, 0.005 to 0.1% of Al, containing one or two or more of Cu, Ni, Cr, Mo, V, Nb, Ti, B, Ca, and rare earth elements, if necessary, and containing the balance, which is iron and inevitable impurities, air-cooling the heated and hot-rolled slab to room temperature, heating the air-cooled slab at the Ac1 to Ac1 transformation point, and slowly cooling the heated slab has been suggested in Japanese Patent Laid-Open Publication No. 1997-256037.

However, the PWHT guarantee time appearing in such a technology is very insufficient in a case of thickening of the steel plate and in a case where a weld portion condition is harsh, and it is impossible to apply the PWHT for an extended period of time of the PWHT guarantee time or more.

Therefore, a steel plate having excellent high-temperature strength at 500° C. even after PWHT for an extended period of time, accompanied by the thickening of the steel plate and the harshness of the weld portion condition has been required.

DISCLOSURE

Technical Problem

An aspect of the present disclosure is to provide a steel plate for high temperature applications having excellent post weld heat treatment (PWHT) resistance without a decrease in high-temperature strength at 500° C. even after PWHT for an extended period of time, and a method for manufacturing the same.

Technical Solution

According to an aspect of the present disclosure, a steel plate for high temperature applications having excellent post weld heat treatment (PWHT) resistance contains: by wt %, 0.05 to 0.25% of C, 0.1 to 1.0% of Mn, 0.1 to 0.8% of Si, 1 to 3% of Cr, 0.05 to 0.3% of Cu, 0.5 to 1.5% of Mo, 0.05 to 0.5% of Ni, 0.005 to 0.1% of Al, one or more of 0.005 to 0.10% of Ir and 0.005 to 0.10% of Rh, a balance of Fe, and inevitable impurities.

The steel plate may have a microstructure comprised of 50 area % or more of tempered martensite and residual tempered bainite, and fine oxide ($IrO_2$ or $Rh_2O_3$) of 1 μm or less may be present inside a grain of the microstructure.

The steel plate may have a high-temperature tensile strength of 400 MPa or more at 500° C. even after PWHT for 100 hours.

According to another aspect of the present disclosure, a method for manufacturing a steel plate for high temperature applications having excellent PWHT resistance includes: a process of reheating a steel slab to a temperature range of 1000 to 1250° C. and then hot rolling the steel slab, the steel slab containing, by wt %, 0.05 to 0.25% of C, 0.1 to 1.0% of Mn, 0.1 to 0.8% of Si, 1 to 3% of Cr, 0.05 to 0.3% of Cu, 0.5 to 1.5% of Mo, 0.05 to 0.5% of Ni, 0.005 to 0.1% of Al, one or more of 0.005 to 0.10% of Ir and 0.005 to 0.10% of Rh, a balance of Fe, and inevitable impurities;

a heat treatment process of maintaining the hot-rolled steel plate in a temperature range of 900 to 1000° C. for a time of 2.5×t+(10 to 30 minutes) (where, t refers to a thickness (mm) of the steel plate);

a process of cooling the heat-treated steel plate at a cooling rate of 0.2 to 30° C./s; and a tempering heat treatment process of maintaining the cooling-controlled steel plate in a temperature range of 700 to 750° C. for a time of 2.5×t+(10 to 30 minutes) (where, t refers to the thickness (mm) of the steel plate).

The steel plate manufactured by the tempering heat treatment process may have a microstructure comprised of 50 area % or more of tempered martensite and residual tempered bainite, and fine oxide ($IrO_2$ or $Rh_2O_3$) of 1 μm or less may be present inside a grain of the microstructure.

Advantageous Effects

As set forth above, according to an exemplary embodiment in the present disclosure, a steel plate for high temperature applications having a high-temperature tensile strength of 400 MPa or more at 500° C. even after PWHT for 100 hours, and a method for manufacturing the same may be provided.

BEST MODE FOR INVENTION

Hereinafter, the present disclosure will be described.

A steel plate for high temperature applications having excellent post weld heat treatment (PWHT) resistance according to the present disclosure contains, by wt %, 0.05 to 0.25% of C, 0.1 to 1.0% of Mn, 0.1 to 0.8% of Si, 1 to 3% of Cr, 0.05 to 0.3% of Cu, 0.5 to 1.5% of Mo, 0.05 to 0.5% of Ni, 0.005 to 0.1% of Al, one or more of 0.005 to 0.10% of Ir and 0.005 to 0.10% of Rh, a balance of Fe, and inevitable impurities.

First, component systems and composition ranges of the steel plate according to the present disclosure will be described in detail. (Hereinafter, contents of respective components refer to wt %.)

Carbon (C)

In the present disclosure, carbon (C) is an element that improves strength, and a content of C is preferably controlled in the range of 0.05 to 0.25%. When the content of C is less than 0.05%, that may be a problem that strength of a matrix itself decreases, and when the content of C exceeds 0.25%, there may be a problem that toughness decreases due to an excessive increase in strength.

In the present disclosure, a lower limit of the content of C is preferably limited to 0.06%, and more preferably limited to 0.08%, and an upper limit of the content of C is preferably limited to 0.24%, and more preferably limited to 0.22%.

Silicon (Si)

In the present disclosure, silicon (Si) is an element that is effective for deoxidation and solid solution strengthening, and is an element accompanied by an increase in an impact transition temperature. Therefore, in order to achieve desired strength, Si needs to be added in an amount of 0.1% or more, but when Si is added in excess of 0.8%, there may be a problem that weldability and impact toughness decrease. In consideration of such a situation, in the present disclosure, the content of silicon (Si) is preferably limited to 0.1 to 0.8%.

In the present disclosure, a lower limit of the content of Si is preferably limited to 0.12%, and more preferably limited to 0.15%, and an upper limit of the content of Si is preferably limited to 0.75%, and more preferably limited to 0.70%.

Manganese (Mn)

In the present disclosure, since manganese (Mn) forms MnS, which is a non-metallic inclusion stretched with S, to decrease room temperature elongation and low temperature toughness, a content of Mn is managed to be 1% or less. However, when Mn is added in an amount less than 0.1%, it is difficult to secure appropriate strength, and thus, the content of manganese (Mn) is limited to be in the range of 0.1 to 1% in the present disclosure.

In the present disclosure, a lower limit of the content of Mn is preferably limited to 0.15%, and more preferably limited to 0.2%, and an upper limit of the content of Mn is preferably limited to 0.95%, and more preferably limited to 0.90%.

Aluminum (Al)

Aluminum (Al) is one of the strong deoxidizers used in a steelmaking process along with the Si. In the present disclosure, the content of Al is preferably limited to be in the range of 0.005 to 0.1%. The reason is that when the content of Al is less than 0.005%, a deoxidation effect is insignificant, and when Al is added in excess of 0.1%, there is a problem that the deoxidation effect is saturated and a manufacturing cost is increased.

In the present disclosure, a lower limit of the content of Al is preferably limited to 0.01%, and more preferably limited to 0.02%, and an upper limit of the content of Al is preferably limited to 0.09%, and more preferably limited to 0.08%.

Chromium (Cr)

In the present disclosure, chromium (Cr) is an element that increases high-temperature strength, and need to be added in an amount of 1.0% or more in order to obtain a strength increase effect, but when Cr is added in excess of 3.0%, there is a problem that a manufacturing cost increases. In consideration of such a situation, in the present disclosure, a content of Cr is limited to be in the range of 1.0 to 3.0%.

In the present disclosure, a lower limit of the content of Cr is preferably limited to 1.1%, and more preferably limited to 1.2%, and an upper limit of the content of Cr is preferably limited to 2.8%, and more preferably limited to 2.5%.

Molybdenum (Mo)

In the present disclosure, similar to Cr, Mo is not only an element that is effective in increasing high-temperature strength, but also an element that prevents occurrence of cracking due to sulfide. In order to obtain the effect described above, Mo needs to be added in an amount of 0.5% or more, but when Mo is added in excess of 1.5%, there is a problem that a manufacturing cost increases. Thus, a content of Mo is preferably 1.5% or less. That is, in the present disclosure, the content of Mo is limited to be in the range of 0.5 to 1.5%.

In the present disclosure, a lower limit of the content of Mo is preferably limited to 0.51%, and more preferably limited to 0.53%, and an upper limit of the content of Mo is preferably limited to 1.4%, and more preferably limited to 1.2%.

Copper (Cu)

In the present disclosure, copper (Cu) is an element that is effective in increasing strength, and needs to be added in an amount of 0.005% or more in order to obtain a strength increase effect. However, Cu is expensive, and thus, is preferably added in an amount of 0.3% or less. Inconsideration of such a situation, in the present disclosure, a content of Cu is limited to be in the range of 0.005 to 0.3%.

In the present disclosure, a lower limit of the content of Cu is preferably limited to 0.007%, and more preferably limited to 0.01%, and an upper limit of the content of Cu is preferably limited to 0.28%, and more preferably limited to 0.25%.

Nickel (Ni)

In the present disclosure, nickel (Ni) is an element that is the most effective in improving low-temperature toughness, and needs to be added in an amount of 0.05% or more in order to obtain such an effect, and when Ni, which is an expensive element, is added in excess of 0.5%, a manufacturing cost may increase. Therefore, in the present disclosure, a content of nickel (Ni) is limited to 0.05 to 0.5%.

In the present disclosure, a lower limit of the content of Ni is preferably limited to 0.07%, and more preferably limited to 0.1%, and an upper limit of the content of Ni is preferably limited to 0.48%, and more preferably limited to 0.45%.

One or more of Ir and Rh

The steel plate according to present disclosure may contain one or more of 0.005 to 0.10% of Ir and 0.005 to 0.10% of Rh in addition to the above compositions.

Iridium (Ir) is an element that is effective in preventing softening of a matrix by forming fine oxide, and needs to be added in an amount of 0.005% or more in order to sufficiently obtain such an effect. However, Ir is expensive, and thus, is preferably added in an amount of 0.1% or less.

Rhodium (Rh) is also an element that may easily form fine oxide like, similar to Ir, and needs to be added in an amount of 0.005% or more in order to sufficiently obtain such an effect. However, Rh is expensive, and thus, is preferably added in an amount of 0.1% or less.

More preferably, Ir and Rh are added in the ranges of 0.01 to 0.08% and 0.05 to 0.09%, respectively.

In the present disclosure, each of Ir and Rh is an element that plays an important role to form fine oxide ($IrO_2$ or $Rh_2O_3$) of 1 μm or less by its addition.

By the addition of these elements, the oxide is preferably formed so that an area fraction thereof is 0.015% or more. The oxides do not grow significantly even at the time of PWHT for an extended period of time, and thus play an important role capable of preventing a decrease in high-temperature strength even after the PWHT for an extended period of time. When the area fraction is less than 0.015%, high-temperature strength may decrease.

The steel plate according to the present disclosure having the composition components as described above may have a microstructure that is a mixed structure of tempered martensite and tempered bainite, and at least 50 area % of the tempered martensite may be contained in the mixed structure.

In addition, fine oxide ($IrO_2$ or $Rh_2O_3$) of 1 μm or less is formed inside an internal structure of the steel plate, that is, inside of a grain, for which the heat treatment is completed. The reason why the structure is controlled in the form described above is to allow the steel plate to have excellent PWHT resistance desired in the present disclosure and have appropriate strength and toughness.

Next, a method for manufacturing a steel plate according to an exemplary embodiment in the present disclosure will be described in detail.

A method for manufacturing a steel plate for high temperature applications having excellent post weld heat treatment (PWHT) resistance includes: a process of reheating a steel slab having the composition components as described above to a temperature range of 1000 to 1250° C. and then hot rolling the steel slab; a heat treatment process of maintaining the hot-rolled steel plate in a temperature range of 900 to 1000° C. for a time of 2.5×t+(10 to 30 minutes) (where, t refers to a thickness (mm) of the steel plate); a process of cooling the heat-treated steel plate at a cooling rate of 0.2 to 30° C./s; and a tempering heat treatment process of maintaining the cooling-controlled steel plate in a temperature range of 700 to 750° C. for a time of 2.5×t+(10 to 30 minutes) (where, t refers to the thickness (mm) of the steel plate).

First, in the present disclosure, the steel slab that satisfies the above composition ranges is reheated to the temperature range of 1000 to 1250° C. The reason is that when the reheating temperature is lower than 1000° C., it is difficult to solid-dissolve solute atoms, and when the reheating temperature exceeds 1250° C., an austenite grain size becomes excessively coarse to impair properties of the steel plate. In addition, in the present disclosure, the reheated steel slab is hot-rolled under normal conditions and then cooled.

Subsequently, in the present disclosure, heat treatment for maintaining the hot-rolled steel plate in the temperature range of 900 to 1000° C. under a condition of 2.5×t+(10 to 30 minutes) (here, t refers to the thickness (mm) of the steel plate) is performed.

When a temperature of the heat treatment is less than 900° C., it is difficult to solid-redissolved solute elements, such that it becomes difficult to secure strength. On the other hand, when the temperature of the heat treatment exceeds 1000° C., growth of grains may occur to impair low-temperature toughness.

In addition, the reason for limiting a maintaining time of the heat treatment is that when the maintaining time is less than 2.5×t+10 minutes (t refers to the thickness (mm) of the steel plate), it is difficult to homogenize a structure, and when the maintaining time exceeds 2.5×t+30 minutes (t refers to the thickness (mm) of the steel plate), productivity may be impaired.

In addition, in the present disclosure, the heat-treated steel plate is cooled at a cooling rate of 0.2 to 30° C./s on the basis of a cooling rate of a central portion thereof. When the cooling rate is less than 0.2° C./s, coarse ferrite grains may be generated during cooling. On the other hand, when the cooling rate exceeds 30° C./s, an excessive cooling facility is required.

Then, in the present disclosure, tempering heat treatment for maintaining the cooling-controlled steel plate in the temperature range of 700 to 750° C. for a time of 2.5×t+(10 to 30 minutes) (where, t refers to the thickness (mm) of the steel plate) is performed.

When a temperature of the tempering heat treatment is less than 700° C., it is difficult to precipitate a fine precipitate, such that it becomes difficult to secure strength. On the other hand, when the temperature of the tempering heat treatment exceeds 750° C., growth of a precipitate occurs to impair strength and low-temperature toughness.

In addition, the reason for limiting a maintaining time of the tempering heat treatment is that when the maintaining time is less than 2.5×t+10 minutes (t refers to the thickness (mm) of the steel plate), it is difficult to homogenize a structure, and when the maintaining time exceeds 2.5×t+30 minutes (t refers to the thickness (mm) of the steel plate), productivity may be impaired.

The steel plate according to the present disclosure obtained by such tempering heat treatment may have a microstructure that is a mixed structure of tempered martensite and tempered bainite, and at least 50 area % of the tempered martensite may be contained in the mixed structure.

In addition, fine oxide ($IrO_2$ or $Rh_2O_3$) of 1 μm or less is formed inside an internal structure of the steel plate, that is, inside of a grain, for which the heat treatment is completed.

The steel plate according to the present disclosure manufactured through the tempering heat treatment process needs to be subjected to PWHT in order to remove residual stress due to a welding process added at the time of manufacturing a pressure vessel or the like. In general, a decrease in strength and toughness is generated occurs after PWHT for an extended period of time. However, the steel plate manufactured by the present disclosure may be welded without a significant decrease in strength and toughness even though the PWHT is performed at 650 to 740° C., which is a usual PWHT temperature condition, for an extended period of time (~100 hours). In particular, the steel plate according to the present disclosure has an excellent high-temperature tensile strength of 400 MPa or more at 500° C. even after PWHT for 100 hours.

MODE FOR INVENTION

The present disclosure will hereinafter be described in detail through Example.

Example

Steel slabs having steel composition components as shown in Table 1 were prepared. Thereafter, the respective steel slabs were subjected to reheating treatment under conditions of Table 2, and then hot-rolled to manufacture hot-rolled plates having thicknesses as shown in Table 2. The respective hot-rolled plates were subjected to heat treatment, cooling, and tempering heat treatment under the conditions of Table 2 to manufacture final steel plates.

After PWHT was performed under the conditions shown in Table 2 on the respective steel plates manufactured under the conditions as described above, yield strength and tensile strength at 500° C. were examined, and examination results are shown in Table 2.

TABLE 1

| Division | C | Mn | Si | Ni | Cr | Mo | Cu | Al | Ir | Rh |
|---|---|---|---|---|---|---|---|---|---|---|
| Inventive Steel 1 | 0.13 | 0.55 | 0.52 | 0.20 | 1.26 | 0.60 | 0.14 | 0.028 | — | 0.07 |
| Inventive Steel 2 | 0.14 | 0.65 | 0.49 | 0.18 | 1.40 | 0.53 | 0.15 | 0.027 | 0.05 | — |
| Inventive Steel 3 | 0.14 | 0.48 | 0.21 | 0.19 | 2.23 | 1.01 | 0.17 | 0.035 | — | 0.08 |
| Inventive Steel 4 | 0.15 | 0.45 | 0.25 | 0.16 | 2.25 | 0.96 | 0.20 | 0.024 | 0.06 | — |
| Comparative Steel 1 | 0.13 | 0.60 | 0.50 | 0.20 | 1.39 | 0.53 | 0.15 | 0.028 | — | — |
| Comparative Steel 2 | 0.14 | 0.55 | 0.23 | 0.17 | 2.15 | 1.01 | 0.19 | 0.029 | — | — |

TABLE 2

| Division | Thickness (mm) of Steel Plate | Reheating Temperature (° C.) | Heat Treatment Condition (° C./hr) | Cooling rate (° C./s) | Tempering Temperature (° C.) | PWHT Temperature (° C.) | PWHT Time (hr) | 500 YS (MPa) | 500 TS (MPa) | Remark |
|---|---|---|---|---|---|---|---|---|---|---|
| Inventive Steel 1 | 100 | 1150 | 970/4.5 | 2.5 | 740 | 710 | 50 | 353 | 438 | Inventive Example 1 |
|  | 150 | 1100 | 980/6.6 | 0.7 | 740 | 710 | 100 | 351 | 428 | Inventive Example 2 |
|  | 200 | 1180 | 960/9.0 | 0.5 | 740 | 710 | 100 | 336 | 427 | Inventive Example 3 |
| Inventive Steel 2 | 100 | 1100 | 970/4.5 | 2.5 | 740 | 710 | 50 | 331 | 428 | Inventive Example 4 |
|  | 150 | 1150 | 980/6.6 | 0.7 | 740 | 710 | 100 | 321 | 429 | Inventive Example 5 |
|  | 200 | 1200 | 960/9.0 | 0.5 | 740 | 710 | 100 | 316 | 420 | Inventive Example 6 |
| Inventive Steel 3 | 100 | 1100 | 970/4.5 | 2.5 | 740 | 710 | 100 | 343 | 429 | Inventive Example 7 |
|  | 150 | 1150 | 980/6.6 | 0.7 | 740 | 710 | 100 | 331 | 428 | Inventive Example 8 |
|  | 200 | 1200 | 960/9.0 | 0.5 | 740 | 710 | 100 | 330 | 429 | Inventive Example 9 |
| Inventive Steel 4 | 100 | 1100 | 970/4.5 | 2.5 | 740 | 710 | 50 | 323 | 438 | Inventive Example 10 |
|  | 150 | 1150 | 980/6.6 | 0.7 | 740 | 710 | 100 | 331 | 432 | Inventive Example 11 |
|  | 200 | 1200 | 960/9.0 | 0.5 | 740 | 710 | 100 | 329 | 437 | Inventive Example 12 |
| Comparative Steel 1 | 100 | 1200 | 970/4.5 | Air-cooling | 740 | 710 | 16 | 212 | 391 | Comparative Example 1 |
|  | 150 | 1150 | 980/6.6 | Air-cooling | 740 | 710 | 50 | 205 | 384 | Comparative Example 2 |
|  | 200 | 1100 | 960/9.0 | Air-cooling | 740 | 710 | 100 | 199 | 373 | Comparative Example 3 |
| Comparative Steel 2 | 100 | 1100 | 970/4.5 | Air-cooling | 740 | 710 | 16 | 227 | 399 | Comparative Example 4 |
|  | 150 | 1100 | 980/6.6 | Air-cooling | 740 | 710 | 50 | 193 | 386 | Comparative Example 5 |
|  | 200 | 1180 | 960/9.0 | Air-cooling | 740 | 710 | 100 | 188 | 360 | Comparative Example 6 |
| Inventive Steel 1 | 100 | 1100 | 970/4.5 | Air-cooling | 740 | 710 | 16 | 222 | 397 | Comparative Example 7 |
|  | 150 | 1100 | 980/6.6 | Air-cooling | 740 | 710 | 50 | 190 | 381 | Comparative Example 8 |
|  | 200 | 1180 | 960/9.0 | Air-cooling | 740 | 710 | 100 | 189 | 357 | Comparative Example 9 |

TABLE 2-continued

| Division | Thickness (mm) of Steel Plate | Reheating Temperature (° C.) | Heat Treatment Condition (° C./hr) | Cooling rate (° C./s) | Tempering Temperature (° C.) | PWHT Temperature (° C.) | PWHT Time (hr) | 500 YS (MPa) | 500 TS (MPa) | Remark |
|---|---|---|---|---|---|---|---|---|---|---|
| Comparative Steel 1 | 100 | 1100 | 970/4.5 | 2.5 | 740 | 710 | 16 | 217 | 390 | Comparative Example 10 |
| | 150 | 1150 | 980/6.6 | 0.7 | 740 | 710 | 50 | 203 | 386 | Comparative Example 11 |
| | 200 | 1200 | 960/9.0 | 0.5 | 740 | 710 | 100 | 197 | 376 | Comparative Example 12 |

It can be seen from Tables 1 and 2 that in Inventive Examples 1 to 12 in which compositions and manufacturing conditions satisfy the compositions and the manufacturing conditions of the present disclosure, even though a PWHT time reaches 50 hours or more and 100 hours, strength and toughness do not decrease, while in Comparative Examples 1 to 6, which are cases where steel composition components and manufacturing conditions deviate from the steel composition components and the manufacturing conditions of the present disclosure, when a PWHT time is small, strength and toughness show levels almost equal to those of Inventive Steels when comparing with Inventive Examples 1 to 12, but as the PWHT time becomes longer (50 hours or more), strength and toughness are significantly deteriorated as compared with Inventive Examples. It is decided that such a result is significantly affected by formation of fine oxide ($IrO_2$ or $Rh_2O_3$) of 1 μm or less by addition of Ir and Rh to steel plates of Inventive Examples. Since such oxide does not grow significantly even at the time of PWHT for an extended period of time, there is an effect of preventing a decrease in strength and toughness even after PWHT for an extended period of time due to the formation of the oxide.

Meanwhile, it can be seen that in Comparative Examples 7 to 9, which are cases where steel composition components are within ranges of the present disclosure, but steel manufacturing conditions are out of ranges of the present disclosure, high temperature strength values are significantly lower than in a case where the steel manufacturing conditions correspond to the manufacturing conditions of Inventive Steels.

In addition, it can be seen that in Comparative Examples 10 to 12, which are cases where steel manufacturing conditions satisfy ranges of the present disclosure, but steel composition components are out of ranges of the present disclosure, high temperature strength values are significantly lower than in a case where the composition components correspond to the composition components of Inventive Steels.

The exemplary embodiments in the present disclosure have been described in the detailed description of the present disclosure, but the present disclosure may be variously modified by those skilled in the art to which the present disclosure pertains without departing from the scope of the present disclosure. Therefore, the scope of the present disclosure is not construed as being limited to the exemplary embodiments described above, but should be defined by not only the following claims, but also equivalents thereto.

The invention claimed is:

1. A steel plate for high temperature applications having excellent post weld heat treatment (PWHT) resistance, comprising, by wt %:
   0.05 to 0.25% of C,
   0.1 to 1.0% of Mn,
   0.1 to 0.8% of Si,
   1 to 3% of Cr,
   0.05 to 0.3% of Cu,
   0.5 to 1.5% of Mo,
   0.05 to 0.5% of Ni,
   0.005 to 0.1% of Al,
   one or more of 0.005 to 0.10% of Ir and 0.005 to 0.10% of Rh,
   a balance of Fe, and
   inevitable impurities,
   wherein the steel plate has a microstructure comprised of 50 area % or more of tempered martensite, and a remainder of residual tempered bainite.

2. The steel plate of claim 1, wherein the microstructure includes a grain that includes fine oxide of either $IrO_2$ or $Rh_2O_3$, and the fine oxide has a size of 1 μm or less.

3. The steel plate of claim 2, wherein the oxide has an area fraction of 0.015% or more.

4. The steel plate of claim 1, wherein the steel plate has a high-temperature tensile strength of 400 MPa or more at 500° C. even after PWHT for 100 hours.

5. The steel plate of claim 1, comprising, by wt %, 0.005 to 0.10% of Rh.

6. The steel plate of claim 1, wherein the steel plate has a microstructure consisting of 50 area % or more of tempered martensite, and a remainder of residual tempered bainite.

* * * * *